United States Patent [19]
Lewis, Jr.

[11] Patent Number: 5,382,362
[45] Date of Patent: Jan. 17, 1995

[54] PAINT SOLVENT RECYCLE DEVICE

[75] Inventor: Homer B. Lewis, Jr., Vero Beach, Fla.

[73] Assignee: Paint-Mate, Inc., Vero Beach, Fla.

[21] Appl. No.: 162,234

[22] Filed: Dec. 6, 1993

[51] Int. Cl.⁶ .............................................. B01D 21/02
[52] U.S. Cl. .................... 210/514; 210/515; 210/532.1; 210/536; 210/538; 210/521
[58] Field of Search ............... 210/513, 514, 515, 521, 210/532.1, 534, 535, 536, 538, 540

[56] References Cited

U.S. PATENT DOCUMENTS

| | | | |
|---|---|---|---|
| 740,957 | 10/1903 | Warden | 210/536 |
| 1,438,048 | 12/1922 | Marsh | 210/535 |
| 2,170,411 | 8/1939 | Jacobs et al. | 210/515 |
| 2,180,849 | 11/1939 | Vrintz | 210/535 |
| 2,762,511 | 9/1956 | Sternaman | 210/536 |
| 5,114,578 | 5/1992 | Sundstrom | 210/521 |

FOREIGN PATENT DOCUMENTS 30162  3/1932  Netherlands.

Primary Examiner—Christopher Upton
Attorney, Agent, or Firm—Carroll F. Palmer

[57] ABSTRACT

A solvent recycle device for containing a volatile solvent with particulate material suspended therein having a density greater than such solvent and enabling the particulate material to gravationally separate from the solvent into a confined lower space isolated from an upper space from which clarified solvent is withdrawn from the device is described. Basically, the device includes an upper chamber with bottom sloping downwardly toward the rear, a lower chamber fixed beneath the upper, a first conduit at the rear connecting the two chambers for fluid flow between them, capped openings into the chambers and a second conduit external of the chambers connecting the top of the upper chamber to the back side of the lower chamber for fluid flow between them.

10 Claims, 2 Drawing Sheets

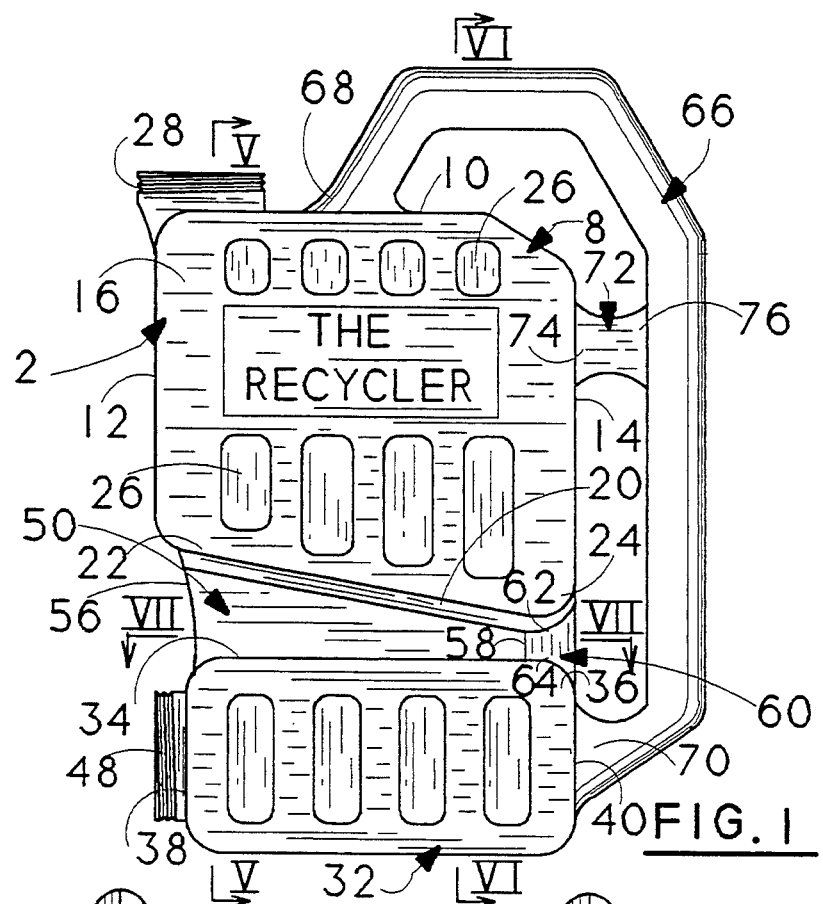
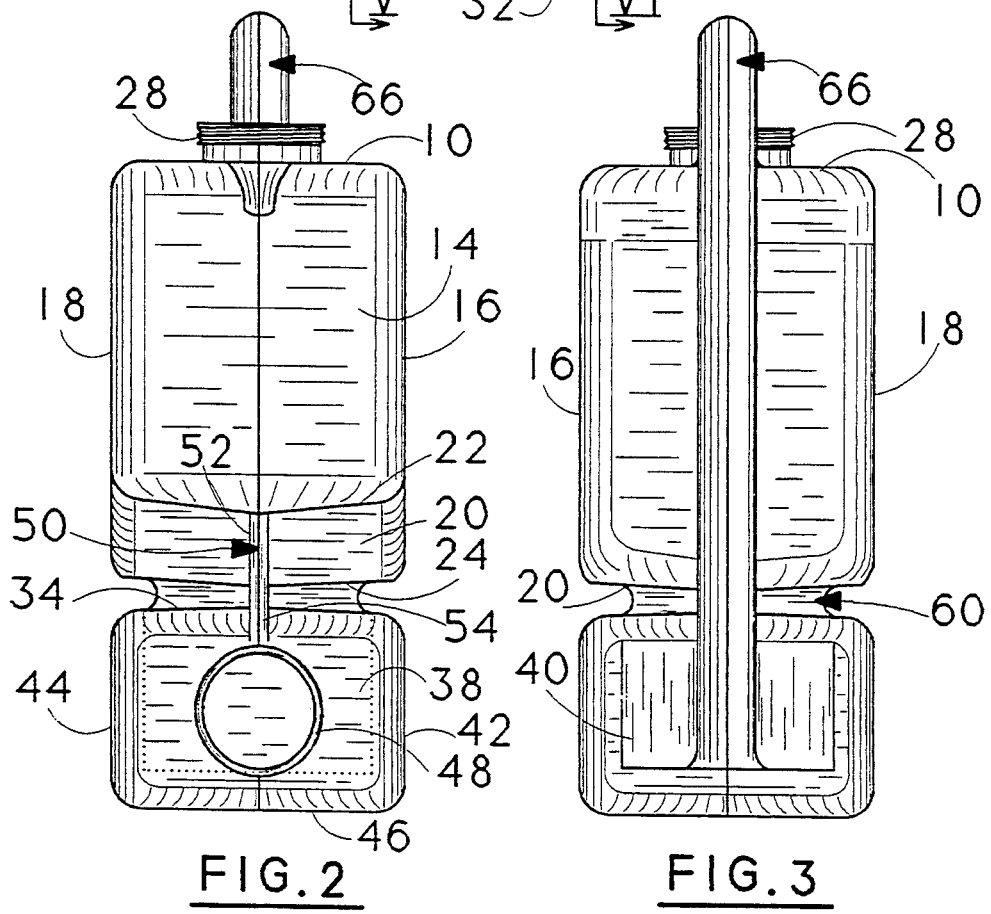
FIG. 1
FIG. 2
FIG. 3

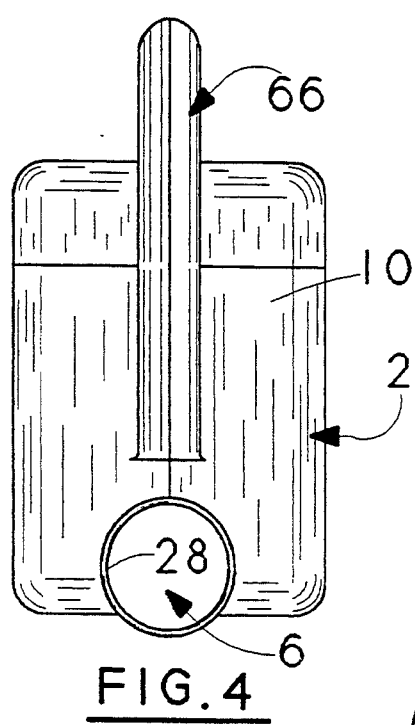
FIG.4
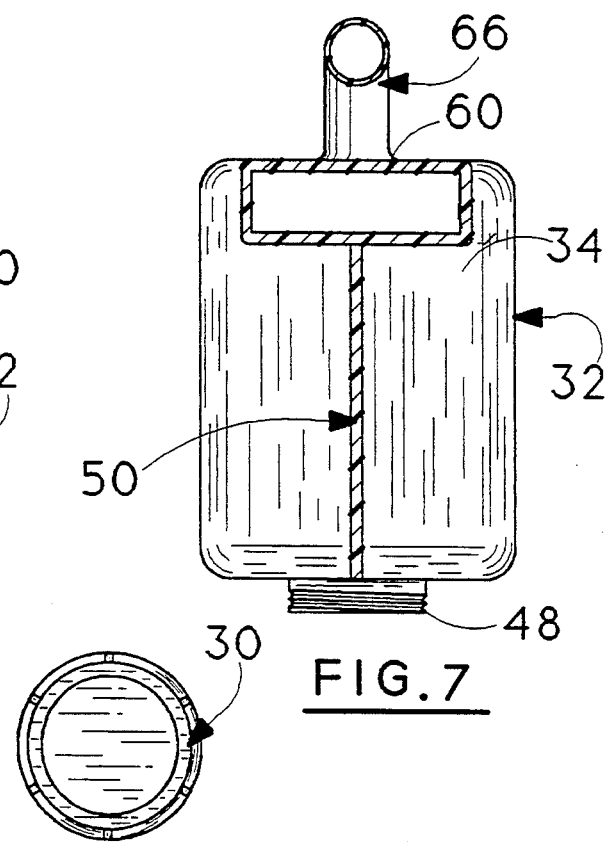
FIG.7
FIG.8
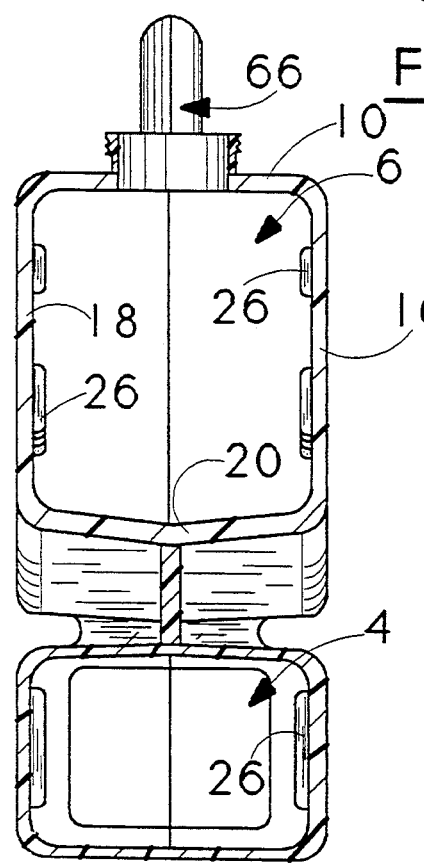
FIG.5
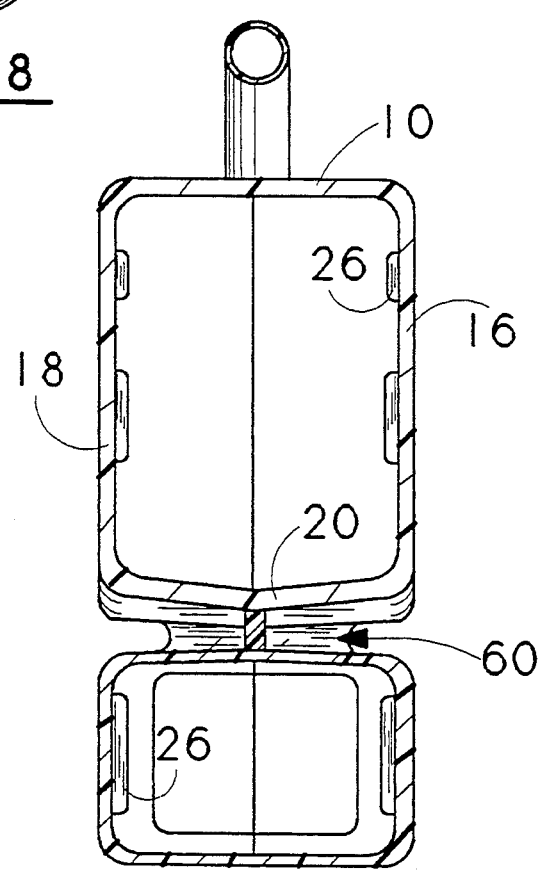
FIG.6

PAINT SOLVENT RECYCLE DEVICE

BACKGROUND OF THE INVENTION

1. Field of the Invention

This application relates to devices for recycling solvents containing suspended particulate matter. More particularly, it concerns such devices that are designed to remove suspended pigment or like solids from portions of solvent that have been used to clean paint brushes so it can be reused for further brush cleaning.

2. Description of the Prior Art

Paint brush cleaning in its simplest form comprises placing a quantity of paint thinner or like solvent in a can or other container, immersing the bristle portion of the brush in the solvent and manipulating the brush so that the solvent gradually removes the paint from the brush. Often, it is necessary to pour the paint contaminated solvent out of the container, add some new clean solvent and repeat the process. In the course of such brush cleaning, a quantity of "dirty" solvent is accumulated.

Paint brush cleaning can also be preformed using known mechanical cleaning devices. Typically, in such devices, a cleaning chamber is filled with a cleaning solution, such as paint thinner. The bristle portion of a paint brush is immersed in the cleaning fluid and contacted with it by rotating cleaning elements mounted in the cleaning chamber. After several cleanings, particulate matter from the paint becomes suspended in the cleaning solvent in such mechanical cleaners. The concentration of particulate matter eventually becomes great enough to diminish its cleaning effectiveness. At that point, the cleaning chamber is filled with new cleaning solvent while a quantity of dirty cleaning solvent is accumulated.

A problem exists with respect to the disposal of used cleaning solvents. Increasingly, stringent environmental laws have made disposal of used cleaning solvents more difficult and expensive. However, the accumulated dirty solvent can be reused (recycled) if it can be efficiently separated from the suspended pigments and other solid particles. The present invention addresses this problem and provides a unique type of device for separating suspended solids from paint thinner and like solvents while permitting supernatant clarified solvent to be easily handled for further use in brush cleaning.

Paint brush holders that permit suspended solids to separate from cleaning solvent contained in the holders are known as show by U.S. Pat. Nos. 2,744,635; 2,908,026 and 4,771,501. However, the recycling of clarified solvent from such holders without remixing sedimented solids is difficult.

It is also known, to form devices for containing liquids that include suspended particulate matter which are structured so as to make it possible for the particulate matter as it precipitates out of the suspending liquid to become isolated in a separate chamber or in some other manner permits clarified liquid to be removed from such containers without redispersing the precipitated particles in the clarified liquid as shown by U.S. Pat. Nos. 2,344,485; 2,583,335; 2,661,844; 2,779,472; 3,280,828 and 3,119,544. The present invention provides a new, unique form of this type separation device that is especially suited for use in the recycling of contaminated paint brush solvent.

OBJECTS

A principal object of the invention is the provision of new devices for recycling paint solvents.

Another object is the provision of a new form of device for separating pigment or other particles suspended in volatile solvent and thereafter permits clarified solvent to be removed from such device without redispersing the precipitated particles in the clarified solvent.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of

BRIEF DESCRIPTION OF THE DRAWINGS

A more complete understanding of the invention can be obtained by reference to the accompanying drawings in which:

FIG. 1 is a lateral view of a solvent recycle device in accordance with the invention.

FIG. 2 is a front view of the device of FIG. 1.

FIG. 3 is a rear view of the device of FIG. 1.

FIG. 4 is a top view of the device of FIG. 1.

FIG. 5 is a sectional view taken on the line V—V of FIG. 1.

FIG. 6 is a sectional view taken on the line VI—VI of FIG. 1.

FIG. 7 is a sectional view taken on the line VII—VII of FIG. 1.

FIG. 8 is a plan view of a threaded plastic cap for use in closing threaded openings in the devices of FIGS. 1-7.

DESCRIPTION OF THE PREFERRED EMBODIMENTS

Referring in detail to the drawings, the solvent recycle device 2 of the invention is designed to contain volatile solvent with particulate material suspended therein having a density greater than the solvent and enable such particulate material to gravitationally separate from the solvent into a confined space 4 isolated from the space 6 from which clarified solvent (not shown) is withdrawn from the device 2.

The device 2 comprises an upper chamber 8 defined by a top wall 10, a front wall 12, a rear wall 14, a first side wall 16, a second side wall 18 and a bottom wall 20.

The bottom wall 20 descends at an angle from the front wall 12 to the rear wall 14 creating in the bottom wall 20 a raised forward end portion 22 and a lowered rearward end portion 24. As seen in FIGS. 5 & 6, the bottom wall 12 has a V-shaped cross section.

The side walls 16 and 18 contain indentations 26 to act as strengthening members for the walls.

There is a threaded opening 28 through the top wall 10 that communicates with the interior 6 of the upper chamber 8 and a threaded cap 30 can be used to close the opening 28.

The device 2 further comprises a lower chamber 32 defined by a top wall 34 comprising a back end portion 36, a front wall 38, a rear wall 40, a first side wall 42, a second side wall 44 and a bottom wall 46.

The side walls 42 and 44 contain indentations 26 to act as strengthening members.

A threaded second opening 48 communicates through the front wall 38 with the interior 4 of the lower chamber 42 and a threaded cap 30 may be used to close the second opening 48.

A trapezoidal web member 50 defined by an upper portion 52 integrally joined to the bottom wall 20 of the upper chamber 8, a lower portion 54 integrally joined to the top wall 34 of the lower chamber 32, a front edge 56 and a rear edge 58. The web member 50 fixes the upper 8 chamber over the lower chamber 32.

A first tubular conduit 60, which is positioned behind the rear edge 58 of the web member 50, is defined by a top end 62 and a bottom end 64. The top end 62 communicates through the lowered rear end portion 24 of the bottom wall 20 with the upper chamber 8 and the bottom end 64 communicates through the back end portion 36 of the top wall 34 with the lower chamber 32.

A second tubular conduit 66 defined by an upper junction end 68 and a lower junction end 70 extends rearward of the upper chamber 8 and lower chamber 32. The upper junction end 68 communicates with the upper chamber 8 through its top wall 10 and the lower junction end 70 communicates with the lower chamber 32 through its rear wall 40.

A spacer member 72 defined by a front end 74 and a rear end 76 is positioned between the rear wall 14 of the upper chamber 8 and the second tubular conduit 66 with the front end 74 integral with the upper chamber rear wall 14 and with the rear end 76 integral with the second tubular conduit 66.

In use of the device 2 with a cap 30 closing opening 48, volatile solvent with particulate material suspended therein having a density greater than the solvent is charged into the device through opening 28. First portions of the solvent will flow down bottom wall 20 and through conduit 60 into lower chamber 32 until it is filled. Then further portions of added solvent will accumulate in upper chamber 8.

When the device has been charged with dirty solvent as described, it will be left to stand in an upright position as shown in FIG. 1, but with a cap 30 closing the opening 28. With the passage of time, particulate material accumulates in the lower chamber 32, building up as a sediment layer on the bottom of space 4. Even though a large portion of particles suspended in the charged dirty solvent will be present initially in the upper space 6, as the device is allowed to stand, such upper space 6 particles will fall to the bottom thereof and slowly move along the bottom 20 into the conduit 60 and ultimately fall to bottom 46 of chamber 32. After sufficient time passes after charging of the dirty solvent, typically a week, clarified solvent (not shown) may be accessed by removing the cap 30 from the opening 28 and pouring such solvent out of the device 2 for reuse. The amount of clarified solvent recovered in this manner will be limited to that contained in the upper chamber 8.

When additional dirty solvent is accumulated, this may be recycled by repeating the above stated charging, sedimentation and discharge steps.

With continued repetition of such operation, eventually a layer of particle sediment of such volume will collect in chamber 32 that it will be desirable to remove all the sediment. This can be done by positioning opening 48 over a suitable container, slowing unscrewing, only partially, the cap 30 closing opening 48 and allowing solvent in chamber 32 to drain past the cap into the container. When the solvent stops flowing, the cap is removed completely from opening 48 so that the layer of sediment in space 4 can be scooped out, discarded and the space 4 cleaned of sediment traces to prepare the device 2 for another long term of use in recycling of dirty solvent.

In use of the device, the conduit 66 serves a dual purpose. First, it acts as a balanced handle for its manipulation. Second, it serves as a "chimney" to equalize pressure between the upper and lower chambers.

The embodiments of the invention in which an exclusive property or privilege is claimed are defined as follows:

1. A solvent recycle device for containing a volatile solvent with particulate material suspended therein having a density greater than said solvent and enabling said particulate material to gravationally separate from said solvent into a confined space isolated from a space from which clarified solvent is withdrawn from said device which comprises:

an upper chamber defined by a top wall, a front wall, a rear wall substantially parallel to said front wall, a first side wall, a second side wall substantially parallel to said first side wall and a bottom wall, said bottom wall descending at an angle from said front wall to said rear wall thereby creating in said bottom wall a raised forward end portion and a lowered rearward end portion, a threaded first opening through said upper chamber top wall communicating with the interior of said upper chamber and a threaded cap closing said first opening, a lower chamber defined by a top wall comprising a back end portion, a front wall, a rear wall substantially parallel to said front wall, a first side wall, a second side wall substantially parallel to said first side wall and a bottom wall substantially parallel to said top wall, a threaded second opening through said lower chamber front wall communicating with the interior of said lower chamber and a threaded cap closing said second opening, a trapezoidal web member defined by an upper portion integrally joined to said bottom wall of said upper chamber, a lower portion integrally joined to said top wall of said lower chamber, a front edge and a rear edge shorter in length than said front edge, said web member fixing said upper chamber over said lower chamber, a first tubular conduit positioned behind said rear edge of said web member defined by a top end and a bottom end, said top end communicating through said lowered rear end portion of said bottom wall with said upper chamber and said bottom end communicating through said back end portion of said top wall with said lower chamber, and a second tubular conduit, defined by an upper junction end and a lower junction end, that extends rearward of said upper and lower chambers, said upper junction end communicating with said upper chamber through said top wall thereof and said lower junction end communicating with said lower chamber through said rear wall thereof.

2. The device of claim 1 wherein said side walls of said upper chamber contain indentations to strengthen said walls.

3. The device of claim 1 wherein said side walls of said lower chamber contain indentations to strengthen said walls.

4. The device of claim 1 having a spacer member defined by a front end and a rear end, said spacer member being positioned between said rear wall of said upper chamber and said second tubular conduit with said front end integral with said upper chamber rear wall and with said rear end integral with said second tubular conduit.

5. The device of claim 4 wherein said second tubular conduit has a circular cross section.

6. The device of claim 5 wherein said upper junction end of said second tubular conduit is flared outwardly beyond said cross section.

7. The device of claim 5 wherein said lower junction end of said second tubular conduit is flared outwardly beyond said cross section.

8. The device of claim 1 wherein said first tubular conduit has a quadrilateral cross section.

9. The device of claim 8 wherein said rear edge of said web member is integral with said first tubular conduit.

10. A solvent recycle device for containing a volatile solvent with particulate material suspended therein having a density greater than said solvent and enabling said particulate material to gravationally separate from said solvent into a confined space isolated from a space from which clarified solvent is withdrawn from said device which comprises:

an upper chamber defined by a top wall, a front wall, a rear wall substantially parallel to said front wall, a first side wall, a second side wall substantially parallel to said first side wall and a bottom wall, said bottom wall descending at an angle from said front wall to said rear wall thereby creating in said bottom wall a raised forward end portion and a lowered rearward end portion and said bottom wall having a V-shaped cross section.

a threaded first opening through said upper chamber top wall communicating with the interior of said upper chamber and a threaded cap closing said first opening, a lower chamber defined by a top wall comprising a back end portion, a front wall, a rear wall substantially parallel to said front wall, a first side wall, a second side wall substantially parallel to said first side wall and a bottom wall substantially parallel to said top wall, a threaded second opening through said lower chamber front wall communicating with the interior of said lower chamber and a threaded cap closing said second opening, a trapezoidal web member defined by an upper portion integrally joined to said bottom wall of said upper chamber, a lower portion integrally joined to said top wall of said lower chamber, a front edge and a rear edge shorter in length than said front edge, said web member fixing said upper chamber over said lower chamber, a first tubular conduit of quadrilateral cross section positioned behind said rear edge of said web member defined by a top end and a bottom end, said top end communicating through said lowered rear end portion of said bottom wall with said upper chamber and said bottom end communicating through said back end portion of said top wall with said lower chamber, a second tubular conduit of circular cross section, defined by an upper junction end and a lower junction end, that extends rearward of said upper and lower chambers, said upper junction end communicating with said upper chamber through said top wall thereof and said lower junction end communicating with said lower chamber through said rear wall thereof, and a spacer member defined by a front end and a rear end, said spacer member being positioned between said rear wall of said upper chamber and said second tubular conduit with said front end integral with said upper chamber rear wall and with said rear end integral with said second tubular conduit.

* * * * *